Figure 3:
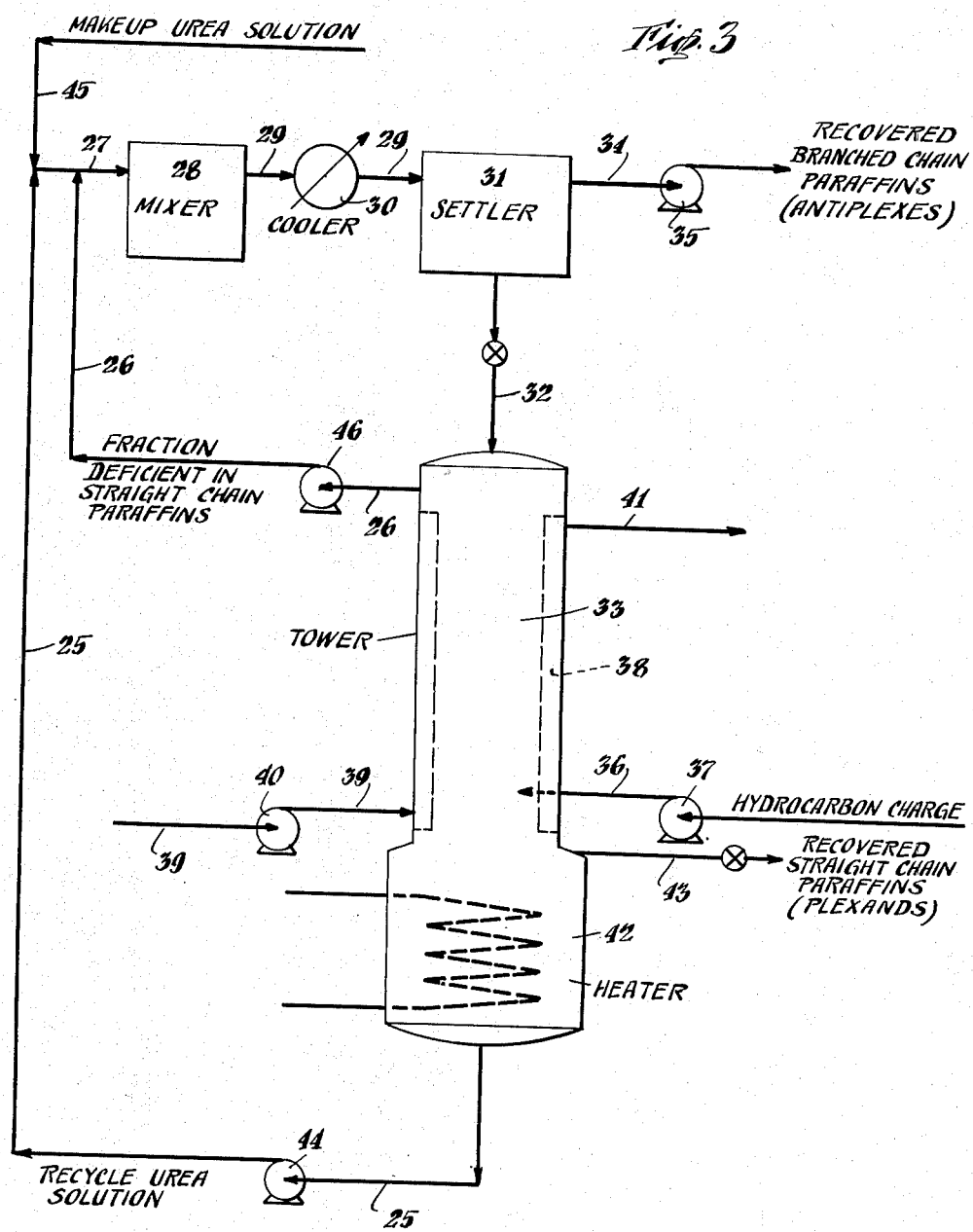

June 15, 1954 — E. GORIN — 2,681,302
SEPARATION OF HYDROCARBONS AND HYDROCARBON DERIVATIVES
Filed Jan. 10, 1950 — 2 Sheets-Sheet 1
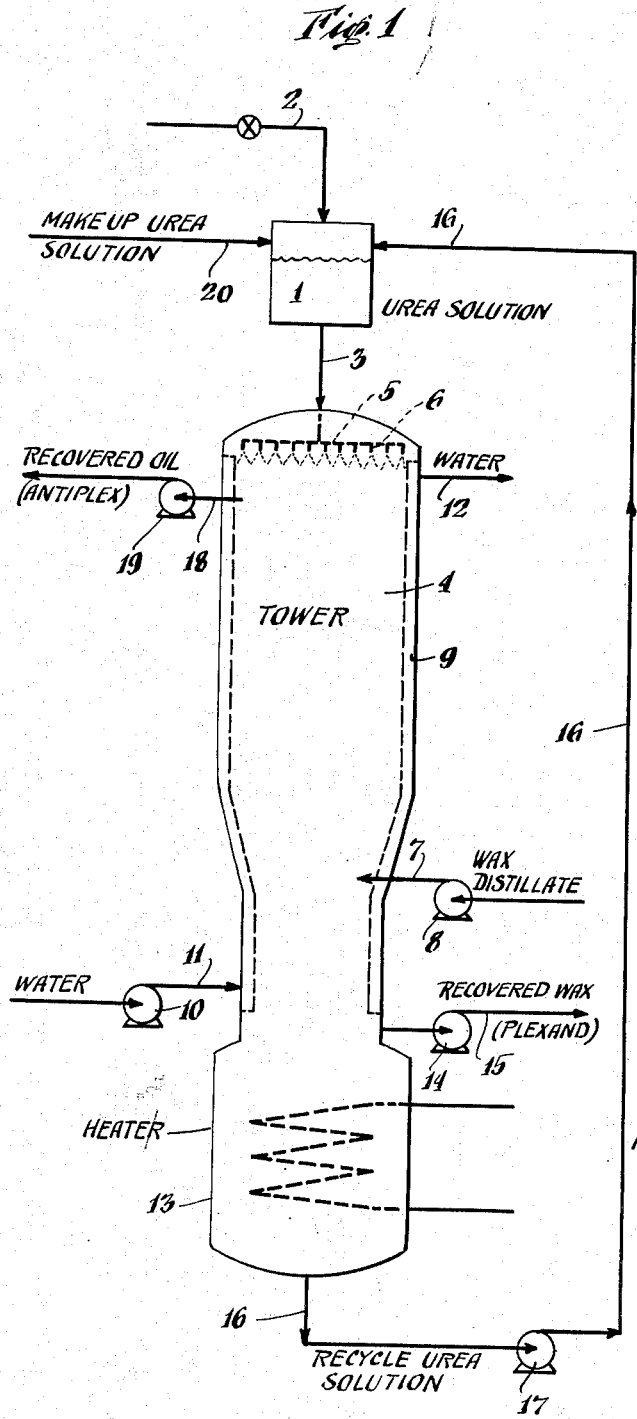
INVENTOR.
Everett Gorin
BY Robert D. Flynn
AGENT OR ATTORNEY Patented June 15, 1954

2,681,302

UNITED STATES PATENT OFFICE 2,681,302

SEPARATION OF HYDROCARBONS AND HYDROCARBON DERIVATIVES

Everett Gorin, Castle Shannon, Pa., assignor to Socony-Vacuum Oil Company, Incorporated, a corporation of New York Application January 10, 1950, Serial No. 137,738

8 Claims. (Cl. 196—17)

This invention has to do with the separation of hydrocarbons and hydrocarbon derivatives of different molecular configuration from mixtures containing the same.

I. FIELD OF INVENTION

Numerous processes have been developed for the separation of hydrocarbons and hydrocarbon derivatives of different molecular configuration by taking advantage of their selective solubility in selected reagents or solvents from which they may later be separated. Exemplary of hydrocarbon separation procedures is the Edeleanu process, wherein paraffinic materials are separated from aromatics by virtue of the greater solubility of aromatics in liquid sulfur dioxide. Lubricant oil solvent refining processes, solvent deasphalting, solvent dewaxing and the like are further examples of the separation of hydrocarbons of different molecular configuration. Typical of selective solvent procedures for separating hydrocarbon derivatives is the separation of paraffin wax, monochlorwax and polychlorwaxes, with acetone as the selective solvent.

This invention is concerned with the general field outlined above, but based upon a different and little-known phenomenon, namely, the differing ability of hydrocarbons and hydrocarbon derivatives to enter into and to be removed from certain crystalline complexes. As used herein, the term "complex" broadly denotes a combination of two or more compounds.

This invention is predicated upon the knowledge that urea and thiourea form complex crystalline compounds to a varying degree with various forms of hydrocarbons and hydrocarbon derivatives.

II. PRIOR ART

For some years it has been known that various isomers of aromatic hydrocarbon derivatives form complexes with urea. Kremann (Monatshefte f. Chemie 28, 1125 (1907)) observed that complexes, designated as "double compounds," of urea and the isomeric cresols are stable at different temperatures. Schotte and Priewe (1,830,859) later separated meta-cresol from the corresponding para isomer by selectively forming a meta-cresol-urea complex, which was described as an "addition compound"; the latter compound was separated from the para isomer and then split up by distillation or with water or acid to obtain pure meta-cresol. The "addition compound" of meta-cresol and urea was shown thereafter to have utility as a disinfectant (Priewe, 1,933,757). Bentley and Catlow (1,980,901) found a number of aromatic amines containing at least one basic amino group capable of forming "double compounds" with certain isomeric phenols. It has also been shown that trans-oestradiol can be separated from the corresponding cis-compound by forming a difficultly soluble compound of urea and trans-oestradiol (Priewe, 2,300,134).

The forces between urea and the compounds of the foregoing complexes are due to specific chemical interaction between the various functional groups.

One heterocyclic compound, 2:6 lutidine, has been found to form a crystalline compound with urea, thus affording a means of separating the lutidine from beta- and gamma-picolines (Riethof, 2,295,606).

Comparatively few aliphatic hydrocarbon derivatives have been known to form complex compounds with urea. In German patent application B190,197, IV d/12 (Technical Oil Mission, Reel 143; Library of Congress, May 22, 1946), Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "Additions—Produkt," with urea. A mixture containing such aliphatic compounds is contacted with a concentrated solution of urea in water, methanol, or ethanol, and the like. In the Technical Oil Mission translation of the Bengen application, however, the urea complexes were designated "adducts," which term apparently stems from the anglicized "addition product." The "adducts" are separated into their components, urea and straight chain hydrocarbon or aliphatic oxygen-containing compound, by heating or by the addition of methanol, water or an aqueous solution.

Thiourea has also been known to form complexes, perhaps the first of which is a complex with ethyl oxalate (Nencki, Berichte 7, 780 (1874)). Recently, crystalline molecular complexes of thiourea and certain organic compounds were described by Angla (Compt. rendus 224, 402–4 and 1166 (1947)). The organic compounds recited include cyclic hydrocarbons such as cyclohexane, cyclohexene, polycyclic terpenes; halides, alcohols and ketones of such cyclic hydrocarbons; and halides of short chain paraffins. Crystalline molecular complexes of such compounds are dissociated by water and organic solvents to their components, thiourea and a compound of the foregoing type.

III. DEFINITIONS

From the foregoing discussion of prior art (II), it will be clear that a variety of terms have been applied to urea and thiourea complexes. The latter have been rather loosely described as "double compounds," "addition compounds," "difficultly soluble compounds," "Additions—Produkt," "adducts," and "crystalline molecular complexes." All of these terms are somewhat ambiguous in that they have also been used to describe products or complexes of different character than the urea complexes under consideration. This is particularly so with the term "adduct," and the related terms "unadducted material" and "non-adducted material." While the term "adduct" is simple and convenient, it is an unfortunate designation, inasmuch as it confuses these complexes with other substances known in the chemical art. Specifically, "adduct" has been applied to Diels-Alder reaction products, formed by reaction of conjugated diolefins and olefins and their derivatives. As is well known, Diels-Alder products as a rule do not revert to their original constituents when heated or treated with water, acids, solvents, etc. Moreover, the term "adduct" has been defined earlier as "The product of a reaction between molecules, which occurs in such a way that the original molecules or their residues have their long axes parallel to one another." (Concise Chemical and Technical Dictionary.) Further ambiguity is introduced by the term "adduction," which has been defined as "oxidation." (Hackh.)

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertable associated complex comprising a plexor, such as urea, and at least one other compound; said plexad characterized by reverting or decomposing, under the influence of heat and/or various solvents, to its original constituents, namely, a plexor and at least one plexand.

Plexand—a compound capable of forming a plexad with a plexor, such as urea and thiourea; compounds of this character differ in their capacity to form plexads, depending upon various factors described hereinafter and in related applications Serial Nos. 115,511 through 115,518 and 116,593, all filed September 13, 1949 (115,511 and 115,512, now abandoned; 115,513 now U. S. Patent No. 2,642,422; 115,516 now abandoned; and 115,518 now U. S. Patent No. 2,642,423), of which this application is a continuation-in-part and which, in turn, are continuations-in-part of application Serial No. 4,997, filed January 29, 1948. Application Serial No. 374,707, filed August 17, 1953, is a continuation of said abandoned application Serial No. 115,511. Application Serial No. 320,012, filed November 12, 1952, and now Patent No. 2,642,424, is a continuation-in-part of said abandoned application Serial No. 115,512 and abandoned application Serial No. 115,730, filed September 14, 1949. Application Serial No. 255,943, filed November 13, 1951, is a continuation of said abandoned application Serial No. 115,516. Application Serial No. 407,197, filed February 1, 1954, is a division of said application Serial No. 115,515. Application Serial No. 410,573, filed February 16, 1954, is a division of application Serial No. 266,547, filed January 15, 1952, which, in turn, is a division of said application Serial No. 115,518 (now Patent No. 2,642,423).

Antiplex—a compound incapable of forming a plexad with a plexor.

Plexor—a compound capable of forming a plexad with a plexand; such as urea and thiourea.

Plexate—to form a plexad.

Plexation—the act, process or effect of plexating.

IV. OUTLINE OF INVENTION

It has been found that the plexation procedures referred to above can be improved materially to provide a more efficient separation of a plexand from a mixture containing one or more plexands. More specifically, it has been found that improvement is realized by introducing a highly saturated plexor solution into a cooler fluid mixture containing one or more plexands, in such a manner that generally spheroidal, solid or semi-solid globules of plexor solution are formed. The globules of plexor solution then interact with the plexand to form a plexad of the same general spheroidal shape.

It has also been found that improved separation is obtained by forming a suspension of solidified plexor globules by agitation of the plexor with an antiplex, and contacting the suspension with a fluid mixture containing one or more plexands.

Another important feature of the invention is the use of a tower wherein the plexand released by decomposition of the plexad is refluxed up into the column to provide for purification of the plexand.

V. OBJECTS

It is an object of this invention, therefore, to provide an effective means for separating hydrocarbons and hydrocarbon derivatives of different molecular configuration from mixtures containing the same.

An additional object is to provide a plexand or plexands substantially free of an antiplex or antiplexes. A corresponding object is the provision of an antiplex or antiplexes substantially free of said plexand or plexands.

Another important object is the provision of a continuous method of separation of said plexands and antiplexes, which method is flexible, capable of relatively sharp separation, and not highly demanding of attention and of utilities such as heat, refrigeration, pumping power, and the like.

Other objects and advantages of the invention will be apparent from the following description.

VI. INVENTION IN DETAIL

As indicated above, it has been found that the foregoing objects are achieved by plexation with urea or thiourea of a mixture containing one or more plexands.

(1) PLEXANDS AND MIXTURES SUITABLE FOR PLEXATION

The hydrocarbon mixtures and oxygen-containing paraffin mixtures mentioned in the discussion of the prior art, above, are contemplated herein. So also are the compounds, plexands, shown therein to have the capacity to form plexads. For example, when urea is used as a plexor, the mixture used may be: isomeric cresols (Kremann; Schotte and Priewe); oestradiols (Priewe); lutidine-picolines (Riethof); hydrocarbons containing straight chain hydrocarbons of at least six carbon atoms per molecule, and oxygen-containing mixtures containing straight chain acids, alcohols, aldehydes, esters and/or ketones having at least six carbon atoms per molecule (Bengen). It will be apparent from the definitions recited above, that the plexands of this mixtures are the compounds forming plexads with urea, and that the antiplexes are the compounds which do not form urea plexads.

Hydrocarbon mixtures containing n-paraffins in the range of C<sub>7</sub>-C<sub>30</sub> and higher, such as wax distillates, foots-oil, gas oils, virgin kerosenes, straight run naphthas are also suitable when urea is used as the plexor, such mixtures being shown in copending application Serial Number 4,997, filed January 29, 1948. Other mixtures shown in the latter application and also suitable here are: hydrocarbon mixtures containing n-paraffins and n-olefins, and prepared by synthesis with carbon monoxide and hydrogen, i. e., typical Fischer-Tropsch products prepared using cobalt and iron catalysts; cracked mixtures prepared by the vapor phase cracking of stocks rich in n-paraffins, such as by the cracking of paraffinic gas oils, foots-oil, crude waxes, etc.; mixtures containing straight chain oxygenated compounds, such as acids, alcohols, aldehydes and esters, and containing branched compounds, such as those obtained by synthesis from hydrogen and carbon monoxide over an iron catalyst or by oxidation of high molecular weight hydrocarbons; mixtures consisting essentially of n-paraffins and n-olefins, for the n-paraffins form stronger plexads than the n-olefins; mixtures consisting essentially of n-olefins with the double bond in various positions, for the olefins having a double bond near the end of the chain form stronger plexads than those having the double bond further from the end of the chain; hydrocarbon mixtures obtained by isomerization, alkylation, dehydrocyclization, dehydrogenation, etc.

Other mixtures which may be more effectively plexated with urea by the present process are those containing hydrocarbon derivatives and shown in application Serial No. 115,511, filed September 13, 1949. Typical of the mixtures described in the latter application are mixtures containing a straight chain halide having the halogen atom attached to a terminal carbon and having at least about five carbons in the chain. Mixtures containing compounds characterized by a nitrogen-containing substituent, are also advantageously plexated with the present process; such mixtures include amines, amides, nitriles, nitroparaffins, etc. and are described in application Serial No. 115,515, filed September 13, 1949. Sulfur-containing compounds present in various mixtures are also plexated efficiently herein; these are shown in application Serial No. 115,516, filed September 13, 1949. Compounds containing cyclic substituents, present in various mixtures, are also efficiently plexated with urea in the present process, as being shown in application Serial No. 116,593, filed September 13, 1949. Plexation with urea of various terminally substituted compounds from mixtures containing the same and non-terminally substituted compounds, described in application Serial No. 115,517, filed September 13, 1949, is also aided materially by the present process.

Urea plexation of a non-terminally mono-substituted compound from mixtures containing the same and a non-terminally poly-substituted compound, described in application Serial No. 115,513, filed September 13, 1949, is also improved substantially by the present process. Similarly, more effective resolution with urea of mixtures containing paraffinic compounds of different degrees of unsaturation is realized herein; these mixtures are described in detail in applications Serial Nos. 115,514 and 115,518, filed September 13, 1949.

With regard to thiourea plexation, the mixtures shown in applications Serial Nos. 115,512 and 115,730, and now abandoned, filed September 13 and 14, 1949, respectively, are suitable in the present process. In application Serial No. 115,512 highly branched paraffins and/or highly branched olefins are separated from straight chain or less highly branched compounds. In application Serial No. 115,730, certain cycloparaffins and/or cyclo-olefins are separated from mixtures of the same and other hydrocarbons.

As shown in said copending application Serial No. 115,511, plexation of a compound, plexand, dissolved in a branched chain hydrocarbon solvent (antiplex) with a saturated urea solution proceeds until the concentration of the plexand is reduced to a certain minimum concentration which may be termed the "equilibrium concentration." In general, the "equilibrium concentration" is lower, the lower the temperature of plexation and is dependent only upon the temperature and not upon the solvent for the plexand, provided the urea solution is maintained saturated with urea and provided the plexand-solvent phase can be regarded as an ideal solution. Also, it has been noted that the "equilibrium concentration" decreases with the increasing molecular weight of the plexands.

Equilibrium values have been determined for a number of compounds by agitating solutions of varying concentrations of various compounds in iso-octane with a 70% methanol-30% water solution and noting the minimum concentration required for plexad formation. The results are summarized in Table I below. These results show that all plexands do not form plexads equally well, i. e., some plexands, secondary in character, form plexads less readily. For example, it will be noted that caproic acid forms a plexad more readily than does capryl alcohol, which, in turn, has a greater capacity for plexad formation than either the corresponding chloride or bromide.

*Table I*

EQUILIBRIUM VALUES

| Structure | "Equilibrium Conc.," Volume Percent | Temp., °C. |
|---|---|---|
| Terminal Substituent: | | |
| H<sub>3</sub>C(CH<sub>2</sub>)<sub>6</sub>COOH | 4.0 | 25 |
| H<sub>3</sub>C(CH<sub>2</sub>)<sub>6</sub>CH<sub>2</sub>OH | 6.0±1 | 27 |
| H<sub>3</sub>C(CH<sub>2</sub>)<sub>6</sub>CH<sub>2</sub>Cl | 13.7 | 25 |
| H<sub>3</sub>C(CH<sub>2</sub>)<sub>6</sub>CH<sub>2</sub>Br | 19.4±1 | 31 |
| H<sub>3</sub>C(CH<sub>2</sub>)<sub>7</sub>CH<sub>3</sub> | 26.0 | 25 |
| Non-Terminal Substituent: | | |
| H<sub>3</sub>CCH<sub>2</sub>CH(CH<sub>2</sub>)<sub>3</sub>CH<sub>3</sub><br>       \|<br>      COOH | No Plexad | 25 |
| H<sub>3</sub>CCH(CH<sub>2</sub>)<sub>5</sub>CH<sub>3</sub><br> \|<br>OH | 43.0±1.5 | 27 |
| H<sub>3</sub>CCH<sub>2</sub>CH(CH<sub>2</sub>)<sub>3</sub>CH<sub>3</sub><br>       \|<br>      CH<sub>2</sub>OH | No Plexad | 25 |
| H<sub>3</sub>CCH(CH<sub>2</sub>)<sub>5</sub>CH<sub>3</sub><br> \|<br>Cl | do | 25 |
| H<sub>3</sub>CCH(CH<sub>2</sub>)<sub>5</sub>CH<sub>3</sub><br> \|<br>Br | do | 30 |

In a similar vein, plexation of a plexand with a saturated thiourea solution proceeds until the concentration of the plexand is reduced to a certain minimum concentration, i. e., "equilibrium concentration." This is described in the aforementioned copending application Serial No. 115,512. When a plexand in an antiplex solvent is contacted with a slurry of thiourea in a saturated thiourea solution, the plexand is plexated to such an extent that its concentration is reduced to its equilibrium value for the given temperature, provided sufficiently long contact times, of the order of 0.5–3 hours, are employed and sufficient excess thiourea is initially present such that the thiourea solvent remains substantially saturated with thiourea after plexation is complete. "Equilibrium concentrations for several representative paraffins and olefins were determined at 25° C., using a thiourea-saturated 70 per cent methanol solution. Normal decane-hydrocarbon solutions of various concentrations of the hydrocarbon being investigated were stirred with thiourea solution until the minimum concentration at which plexation would take place was defined within ±2.5 per cent. The results are shown in Table II, below.

*Table II*

EQUILIBRIUM VALUES IN THE THIOUREA PLEXATION OF PARAFFINS AND OLEFINS

| Hydrocarbon | Temp., °C. | "Equilibrium Conc." in Volume Percent |
| --- | --- | --- |
| Isopentane | 25.0 | 62.5±2.5 |
| 2,3-Dimethyl Butane | 25.5 | 29.8±1.2 |
| 2,2-Dimethyl Butane | 25.5 | 10.7±0.8 |
| 2,2,3-Trimethyl Butane | 25.5 | 11.1±0.5 |
| 2,2,3-Trimethyl Pentane | 25.5 | 83.8±1.3 |
| 2,2,4-Trimethyl Pentane | 25.5 | 43.8±1.3 |
| Diisobutylene | 25.0 | 32.5±2.5 |

The completeness with which a particular hydrocarbon may be removed by thiourea plexation may be increased by lowering the temperature. The "equilibrium concentration" in an antiplex solvent generally decreases by a factor of about two (2) in lowering the temperature from 25° C. to 0° C., and by another factor of about 2.3 in lowering the temperature from 0° C. to −25° C. This relationship is shown by the following. "Equilibrium concentrations" for plexad formation of 2,2,3-trimethyl butane and diisobutylene, respectively, were determined at 0° C. for comparison with the values at 25° C. The results are given below in Table III.

*Table III*

| Hydrocarbon | "Equilibrium Conc." (A) in Vol. Percent at 0° C. | "Equilibrium Conc." (B) in Vol. Percent at 25° C. | B/A | A/B |
| --- | --- | --- | --- | --- |
| 2,2,3-Trimethyl Butane | 5.9±1.1 | 11.1±0.5 (25.5° C.) | ≅1.9 | ≅0.53 |
| Diisobutylene | 17.5±0.8 | 32.5±2.5 | ≅1.9 | ≅0.54 |

(2) ANTIPLEX

An antiplex, as defined above, is a compound incapable of forming a plexad with a plexor, such as urea or thiourea.

(3) PLEXOR

The plexors used herein include urea and thiourea, each of which is used in solution in a suitable solvent. This solution contains sufficient plexor such that it is considerably supersaturated when cooled to plexating temperatures, for example, about 0° C. to about 30° C., depending upon the molecular weight of the fluid mixture being processed. By way of illustration, plexating temperatures recommended with mixtures containing n-paraffins, or straight chain paraffins, are: $C_7$–$C_9$, −10 to +10° C.; $C_{10}$–$C_{14}$, 0–20° C.; $C_{15}$–$C_{20}$, 10–25° C.; and $C_{20}+$, 20–35° C.; respectively. Further details with regard to temperature conditions are provided in the aforementioned applications.

The amount of plexor solvent used can be quite small, that is, just sufficient to lower the melting point of the plexor to about 100° C. or slightly less, and to catalyze the plexation.

The plexor solvent, physically, should have at least a slight solvent power for the hydrocarbons, hydrocarbon derivatives, etc., under treatment. The solvent, chemically, should be substantially inert to the compounds of the mixture and also to the urea and thiourea; that is, the solvent should not be such as to convert an appreciable portion of the compounds, urea and thiourea to other compounds which cannot participate in plexation. Preferably, the solvent should be heat stable, both alone and in contact with urea or thiourea, at temperatures at which the desired plexad is not heat stable.

Solvents generally useful are selected from the class of alcohols such as methanol, ethanol, propanol, etc.; water; ethers, such as ethylene glycol dimethyl ether; and amines such as triethylamine, hexylamine, piperidine. Other solvents which can be employed include ethylene glycol and the higher glycols, particularly the butylene glycols; diamines such as diaminoethane, -propane and -butane; formic acid; acetic acid; formamide, and acetonitrile.

It is also contemplated herein to include a small quantity of a surface active agent in the urea or thiourea solution, in the manner described in copending application Serial No. 115,437, filed September 13, 1949, which has been abandoned.

(4) TYPICAL SEPARATIONS

In order that this invention may be more readily understood, typical separations are described below with reference being made to Figures 1, 2 and 3 attached hereto.

In Figure 1, a quantity of concentrated urea solution is maintained in reservoir 1 at a temperature of about 60° C. to about 100° C., for example. The urea solution contains sufficient urea such that it is considerably supersaturated when cooled to plexating temperatures, for example about 0° C. to about 35° C. depending upon the molecular weight of the material being processed, such as a hydrocarbon oil. For purposes of illustration here, a hydrocarbon fraction containing straight chain and branched chain paraffins, such as a wax distillate fraction containing about 92.8 per cent oil and about 7.2 per cent hydrocarbon wax, is processed.

When a relatively viscous mixture is treated it is desirable to reduce its viscosity by the addition of a light antiplex diluent such as a light naphtha. Diluent can be introduced into reservoir 1 through a separate inlet line (not shown).

Pressure is applied to the surface of the urea solution by an inert gas, such as nitrogen, which is introduced through valved line 2. Urea solution is forced out of reservoir 1 through line 3 to tower 4. In order to evenly distribute urea solution in tower 4, line 3 is provided with line 5 which contains a number of nozzles 6, connected in parallel. The pressure in line 1 and the size of the nozzles 6 are adjusted to regulate the size of the droplets or globules coming from the nozzles. The droplets generally vary in diameter from about 10 microns to about 500 microns (or about the size of small peas). It will be understood that any of the well known means for providing a fine spray of material can be used in place of line 5. For example, line 3 can be provided with a perforated line extending across the upper portion of tower 4, or a ring containing a number of orifices.

The hydrocarbon fraction, containing straight chain paraffins and branched chain paraffins, is introduced into the tower 4 through line 7 by pump 8, and the hydrocarbons flow countercurrently to the urea droplets. The temperature of tower 4 is maintained at about 20° C. to about 35° C. for efficient plexation, by means of a coolant, such as water, which is circulated through tower jacket 9 by means of pump 10 in line 11 to line 12.

Urea droplets and hydrocarbon fraction come into contact in tower 4 whereupon rigid or semirigid beads are formed due to the cooling action of the hydrocarbons on the super-saturated urea solution. Plexads form within the beads or spheres due to interaction between the urea globules and the plexands.

When the urea droplets are relatively small, as of the order of about 20 microns, the plexad beads are preferably maintained in suspension in the hydrocarbon fraction and prevented from coagulating to a solid bed by regulating the rate of addition and rate of fall of the beads to provide a relatively dilute suspension. The rate of fall of the plexad beads in the hydrocarbon fraction is regulated or adjusted by the height of tower 4 and the linear velocity of the oil. The contact time of the plexad beads in tower 4 is preferably maintained within the range of 1–15 minutes, while the contact time of the hydrocarbon fraction is generally somewhat longer, as about 20 minutes.

The plexad beads fall through the hydrocarbon fraction, as a result of their greater density, into heater 13 wherein they are melted and resolved. In this way, straight chain or n-paraffins are liberated and the urea solution is reconstituted. Heater 13 is maintained about 40° C. higher than the temperature of tower 4. As a precaution the temperature in heater 13 is generally maintained below about 100° C. when urea is used, lest some urea be lost by decomposition, or even lower if the plexand of the plexad should decompose at a lower temperature. Similarly, when thiourea is used as the plexor, the heater temperature is kept below about 125° C.

The warm straight chain paraffins tend to rise up through heater 13 to tower 4 where they are cooled by the cooler temperature of tower jacket 9, and simultaneously wash descending plexad beads free of adhering hydrocarbons. In this way, a fraction of the liberated straight chain paraffins is refluxed to tower 4. The pure straight chain paraffins are pumped out of tower 4 by means of pump 14 in line 15. A porous filter disc, or similar means (not shown) can be provided in line 15 to prevent plexad beads from passing through with recovered n-paraffins.

Urea solution set free in heater 13 is pumped therefrom through line 16 and pump 17 to reservoir 1 for re-use. It will be understood that make up urea can be added to reservoir 1 through line 20 to provide for minor mechanical or entrainment losses of urea solution and/or to provide for any adjustment of urea concentration.

Branched chain paraffins are not plexated in tower 4 and flow to the top of the tower to line 18, through which they are removed by means of pump 19.

It is advantageous to use larger size plexad beads, that is, greater than about 100 microns, when relatively long contact times, for example 15 minutes or more, are required. The plexad beads, after they have formed while falling through a body of hydrocarbon fraction, are allowed to settle to a compact bed. The bed floats on top of the hot urea solution in heater 13 and moves down tower 14 as the plexad beads are melted by the hot urea solution. In this way, the contact time is adjusted by the rate of application of heat to the hot urea solution in heater 13.

One typical means for operating tower 4 (Figure 1) is illustrated in Figure 2. As shown, a perforated plate 21 is positioned in the tower above line 7, through which the wax distillate charge is introduced, and a solid plate 22 is positioned therein below line 7. Plates 21 and 22, therefore, define a system such as a bubble plate. Centrally positioned in the tower and secured by plates 21 and 22 is conduit 23 (or several such conduits if desired). Conduit 23 has open cap 24 attached at the upper end, and is of such length that the upper end and cap 24 extend above perforated plate 21 and the lower end thereof extends below line 15. In operation, then, a dilute suspension of plexor solution and hydrocarbons is present in the tower above cap 24; and a dense fluidized phase of plexads, plexor globules and hydrocarbons, is present in the region about the perforated plate 21 inasmuch as this region is richest in wax plexand present in the incoming wax distillate charge. The dense phase travels down through pipe 23, with the generally spheroidal plexads forming a compact bed in that portion of the tower about the lower end of pipe 23 and above the molten wax plexand in heater 13. The wax plexand set free in heater 13 rises up through the plexad bed and is removed through line 15.

One advantage of the foregoing process resides in the large amount of n-hydrocarbon which can be recovered per unit quantity of urea solution circulated. Thus, it has been found that up to twenty-five per cent by volume of n-hydrocarbon can be adsorbed in the urea solution by this technique. Using conventional methods such as described in the aforesaid applications, only about seven to about ten per cent of n-hydrocarbon is adsorbed due to the fact that the urea solvent becomes very thick and difficult to handle when larger quantities of the n-hydrocarbon are employed. In addition, pure plexand is obtained in the present procedure with elimination of washing of plexad with inert solvent and subsequent distillation to remove the latter solvent.

Figure 3 shows a related processing technique, which involves formation of a suspension of solidified urea-solvent droplets by agitation and cooling the suspension in the antiplex fraction rather than by dropping the hot urea solution through the hydrocarbons. Heated urea solution, at about 70° C., in line 25 and n-paraffin-deficient oil (oil containing some n-paraffins) in line 26, are introduced through line 27, to mixer 28 wherein they are efficiently stirred. The emulsified mixture thus formed is taken through line 29 and cooler 30 to settler 31. When so cooled to about 25° C., a mixture of urea and urea solvent solidifies in the form of a mass of individual particles and settles to the bottom of settler 31. The solidified mixture is taken through valved line 32 to the top of tower 33. In settler 31, the n-paraffin deficient oil (or antiplex) forms the upper layer and is removed through line 34 by means of pump 35.

In tower 33, the hydrocarbon charge containing n-paraffins and branched chain paraffins, such as a wax distillate, is introduced through line 36 by means of pump 37. The temperature of tower 33 is also maintained at about 20° C. to about 35° C. for efficient plexation, and temperature control is realized by circulating a coolant, such as water, through tower jacket 38 by means of line 39, pump 40 and line 41. The solid particles from the top of tower 33 settle through the oil (from line 36) at a rate designed to allow the particles to collect (by plexation) sufficient n-paraffins to produce a final mass comprising from about five to about 25 per cent, by volume, of n-paraffins. That is, the residence time of the beads in the tower is regulated to fall within the range of 1–15 minutes. The urea solvent-urea plexad mixture thus formed falls into heater 42 wherein it is heated to about 60–100° C. to decompose the plexads. Upon decomposition of the plexads, n-paraffins are set free and the urea solution is reconstituted. The liberated n-paraffins are removed from the system through valved line 43. Reconstituted urea solution is removed from the heater 42 through line 25, which has pump 44 positioned therein. Makeup urea solution is introduced through line 45 whenever necessary.

In tower 29, the branched chain paraffins are not plexated and rise to the top of the tower together with a small amount of unplexated n-paraffins, thus constituting an n-paraffin-deficient oil. The latter is taken from tower 33 through line 26 by means of pump 46.

I claim:
1. The process for separating a compound (I) having the capacity to form a crystalline complex with a complex-forming agent selected from the group consisting of urea and thiourea, from a mixture containing said compound (I) and a compound (II) incapable of forming a crystalline complex with the same said agent, which comprises: introducing into an upper section of a tower a highly saturated solution of said complex-forming agent, said solution flowing downwardly through the tower; introducing said mixture into a central section of the tower, the mixture being maintained at a lower temperature than said solution and at which temperature said solution is supersaturated with said agent, the said mixture being in contact with the downwardly flowing solution in a central section of the tower, whereby rigid globules of said agent are formed; retaining said rigid globules in said mixture until complex formation occurs with the formation of a complex of said agent and said compound (I) in generally spheroidal form, in a central section of said tower; thermally decomposing said complex to set free compound (I) of said complex and to reconstitute said solution, in a lower section of the tower, whereby said compound (I) is refluxed through said complex spheroids; and withdrawing said freed compound (I) from the tower below the introduction of said mixture.

2. The process of claim 1, wherein the mixture is a mixture of hydrocarbons.
3. The process of claim 1, wherein the mixture is a hydrocarbon wax distillate.
4. The process of claim 1, wherein the complex-forming agent is urea.
5. The process for separating wax from a hydrocarbon wax distillate, which comprises: introducing into an upper section of a tower a highly saturated urea solution, said solution flowing downwardly through the tower; introducing said distillate into a central section of the tower, the distillate being maintained at a lower temperature than said urea solution and at which temperature said urea solution is supersaturated with urea, the said distillate and said downwardly flowing solution being in contact in a central section of the tower, whereby rigid urea globules are formed; retaining said rigid urea globules in contact with said distillate until complex formation occurs with the formation of a wax-urea complex in generally spheroidal form, in a central section of said tower; thermally decomposing said wax-urea complex to set free the wax thereof and to reconstitute said urea solution, in a lower section of the tower, whereby said wax is refluxed through said wax-urea complex spheroids; and withdrawing said freed wax from the tower below the introduction of said distillate.

6. The process for separating a compound (I) having the capacity to form a crystalline complex with a complex-forming agent selected from the group consisting of urea and thiourea, from a mixture containing said compound (I) and a compound (II) incapable of forming a crystalline complex with the same said agent, which comprises: contacting a highly saturated solution of said complex-forming agent with said compound (II), the latter compound being maintained at a lower temperature than said solution and at which temperature said solution is supersaturated with said agent, whereby a suspension of rigid globules of said agent are formed; introducing said suspension into an upper section of a tower, said suspension flowing downwardly through the tower; introducing said mixture into a central section of the tower, wherein it is in contact with the downwardly flowing suspension; retaining said suspension in contact with said mixture until complex formation occurs with the formation of a complex of said agent and said compound (I) in generally spheroidal form, in a central section of the tower; thermally decomposing said complex to set free compound (I) of said complex and to reconstitute said solution, in a lower section of the tower, whereby said compound (I) is refluxed through said complex spheroids; and withdrawing said freed compound (I) from the tower below the introduction of said mixture.

7. The process for separating a compound (I) having the capacity to form a crystalline complex with a complex-forming agent selected from the group consisting of urea and thiourea, from a mixture containing said compound (I) and a compound (II) incapable of forming a crystalline complex with the same said agent, which comprises: contacting a highly saturated solution of said complex-forming agent with said compound (II), the latter compound being maintained at a lower temperature than said solution and at which temperature said solution is supersaturated with said agent, whereby a suspension of rigid globules of said agent are formed;

separating said compound (II), added in the preceding operation, from said suspension; introducing said suspension into an upper section of a tower, said suspension flowing downwardly through the tower; introducing said mixture into a central section of the tower, wherein it is in contact with the downwardly flowing suspension; retaining said suspension in contact with said mixture until complex formation occurs with the formation of a complex of said agent and said compound (I) in generally spheroidal form, in a central section of the tower; thermally decomposing said complex to set free compound (I) of said complex and to reconstitute said solution, in a lower section of the tower, whereby said compound (I) is refluxed through said complex spheroids; and withdrawing said freed compound (I) from the tower below the introduction of said mixture.

8. The process for separating a compound (I) having the capacity to form a crystalline complex with a complex-forming agent selected from the group consisting of urea and thiourea, from a mixture containing said compound (I) and a compound (II) incapable of forming a crystalline complex with the same said agent, which comprises: contacting a solution of said complex-forming agent with said compound (II); cooling the resulting mixture of compound (II) and said solution to a temperature at which a mixture of said agent and solvent for said agent solidifies in the form of a mass of particles; separating said compound (II), added in the preceding operation, from said mass of particles; introducing said mass of particles into an upper section of a tower, said mass of particles flowing downwardly through the tower; introducing said mixture into a central section of the tower, wherein it is in contact with the downwardly flowing mass of particles; retaining said mass of particles in contact with said mixture until complex formation occurs with the formation of a complex of said agent and said compound (I) in generally spheroidal form, in a central section of the tower; thermally decomposing said complex to set free compound (I) of said complex and to reconstitute said solution, in a lower section of the tower, whereby said compound (I) is refluxed through said complex spheroids; and withdrawing said freed compound (I) from the tower below the introduction of said mixture.

References Cited in the file of this patent

UNITED STATES PATENTS

| Number | Name | Date |
|---|---|---|
| 2,081,720 | Van Dijck | May 25, 1937 |
| 2,369,559 | Gilliland | Feb. 13, 1945 |
| 2,499,820 | Fetterly | Mar. 7, 1950 |